US012598680B2

(12) United States Patent
Wu et al.

(10) Patent No.: US 12,598,680 B2
(45) Date of Patent: Apr. 7, 2026

(54) LIGHTING CONTROL CIRCUIT, LIGHTING CONTROL METHOD, AND LIGHTING CIRCUIT

(71) Applicant: Joulwatt Technology Co., Ltd., Hangzhou (CN)

(72) Inventors: Minghao Wu, Hangzhou (CN); Guoqiang Liu, Hangzhou (CN)

(73) Assignee: Joulwatt Technology Co., Ltd., Hangzhou (CN)

( * ) Notice: Subject to any disclaimer, the term of this patent is extended or adjusted under 35 U.S.C. 154(b) by 161 days.

(21) Appl. No.: 18/590,802

(22) Filed: Feb. 28, 2024

(65) Prior Publication Data

US 2024/0314900 A1 Sep. 19, 2024

(30) Foreign Application Priority Data

Mar. 13, 2023 (CN) ........................ 202310265450.2

(51) Int. Cl.
*H05B 45/14* (2020.01)
*H05B 45/325* (2020.01)

(52) U.S. Cl.
CPC ........... *H05B 45/14* (2020.01); *H05B 45/325* (2020.01)

(58) Field of Classification Search
CPC ...... H05B 45/14; H05B 45/325; H05B 45/10; H05B 45/3725; H05B 45/30; H05B 45/37; H05B 45/50; H05B 47/165
See application file for complete search history.

(56) References Cited

U.S. PATENT DOCUMENTS

2011/0057573 A1* 3/2011 Jutras ..................... H05B 45/10 315/185 R
2015/0237694 A1* 8/2015 Zudrell-Koch ...... H05B 39/044 315/307

FOREIGN PATENT DOCUMENTS

| | | | | | |
|---|---|---|---|---|---|
| CN | 101466187 | A | | 6/2009 | |
| CN | 101754530 | A | | 6/2010 | |
| CN | 207733019 | U | | 8/2018 | |
| CN | 110062500 | A | | 7/2019 | |
| CN | 113556845 | A | | 10/2021 | |
| CN | 114423116 | A | | 4/2022 | |
| KR | 20010062399 | A | * | 7/2001 | ......... H04B 7/15535 |

* cited by examiner

*Primary Examiner* — Abdullah A Riyami
*Assistant Examiner* — Syed M Kaiser
(74) *Attorney, Agent, or Firm* — IPro, PLLC

(57) ABSTRACT

The present application discloses a lighting control circuit, a lighting control method, and a lighting circuit. The lighting control circuit includes at least a protocol conversion circuit, and a driving signal generation circuit. The dimming selection circuit stores an input data signal as multi-channel digital signals. The driving signal generation circuit controls an off time of a main power transistor according to a first dimming signal derived from the multi-channel digital signals in a first dimming mode, and controls an off time of the main power transistor according to a reference signal derived from the multi-channel digital signals and an output feedback signal in a second dimming mode. The lighting control circuit according to the present disclosure stores the input data signal as multi-channel digital signals, and the circuit can be configured with different dimming modes according to the protocol alone to improve the circuit flexibility.

14 Claims, 5 Drawing Sheets

LIGHTING CONTROL CIRCUIT, LIGHTING CONTROL METHOD, AND LIGHTING CIRCUIT

CROSS-REFERENCE TO RELATED APPLICATIONS

The present disclosure claims priority to a Chinese patent application No. 202310265450.2, filed on Mar. 13, 2023, and entitled "LIGHTING CONTROL CIRCUIT, LIGHTING CONTROL METHOD, AND LIGHTING CIRCUIT", the entire contents of which are incorporated herein by reference, including the specification, claims, drawings and abstract.

TECHNICAL FIELD

The present disclosure relates to the field of power electronics technology, and more particularly, to a lighting control circuit, a lighting control method, and a lighting circuit.

BACKGROUND

Today, many LED lighting products based on LED dimming technology have appeared on the market, mainly for landscape decorative lighting and architectural decorative lighting. LED lighting products can be seen as a load, and a switching power supply can be used to supply power to the load.

In a case that the switching power supply is used for supplying power to a load, an inductor current and an output voltage are typically sampled, and an output current or an output voltage may be adjusted according to a feedback signal derived from the corresponding sampling signals. With an integration trend of electronic devices, many switching power supplies are used in the form of integrated circuits. A chip in which a switching power supply is integrated typically has pins to be configured for certain functions, outside of which there may be even resistors for configuring the functions of the pins. The more pins of the chip, the more peripheral circuits, and the less the choice of package schemes, which is disadvantageous for cost reduction while limiting the scope of its application. In addition, most of the commercially available products controls the switching power supply for dimming with a PWM dimming signal. The dimming mode is limited, and the driving voltage or driving ability is fixed, which can not be compatible with a variety of switching power supplies. Therefore, it is necessary to provide improved technical solutions to overcome the above technical problems in the existing technology.

SUMMARY

In view of this, it is an object of the present disclosure to provide a lighting control circuit, a lighting control method, and a lighting circuit to solve problems in the prior art.

According to a first aspect of the present disclosure, there is provided a lighting control circuit comprising:

a main power transistor;

a protocol conversion circuit that stores received input data signal as multi-channel digital signals;

a dimming selection circuit that is coupled to the protocol conversion circuit, and selects a second-channel digital signal and a third-channel digital signal to be output as a first dimming signal or a third-channel digital signal to be output as a second dimming signal according to a value of a first-channel digital signal;

a feedback circuit that is coupled to the dimming selection circuit and generates a reference signal according to the second dimming signal and an output feedback signal; and a driving signal generation circuit that is coupled to the dimming selection circuit, the feedback circuit, and a control terminal of the main power transistor, and generates a driving signal according to the first dimming signal to control an off time of the main power transistor to achieve a first dimming mode, and generates a driving signal according to the reference signal and the output feedback signal to control an off time of the main power transistor to achieve a second dimming mode.

Optionally, the first dimming mode is a chopper dimming mode, the second dimming mode is an analog dimming mode, the first dimming signal is a PWM dimming signal, and the second dimming signal is an analog dimming signal.

Optionally, the driving signal generation circuit adjusts a duty ratio of the driving signal according to the first dimming signal to adjust a value of a current flowing through the main power transistor; and the feedback circuit adjusts an off time of the main power transistor by adjusting a value of the reference signal according to the second dimming signal to adjust a peak value of a current flowing through the main power transistor.

Optionally, the dimming selection circuit comprises:

a dimming mode selection unit that outputs a first selection signal or a second selection signal according to a value of the received first-channel digital signal for configuring a dimming mode;

a first DAC unit that converts the third-channel digital signal into the analog dimming signal and a brightness regulation parameter according to the second selection signal; and a PWM generator that receives the second-channel digital signal and the brightness regulation parameter to output the PWM dimming signal according to the first selection signal.

Optionally, the protocol conversion circuit comprises:

a decoder that decodes the input data signal for transmission in a plurality of bits;

a register bank that has a plurality of registers for sequentially storing a plurality of bits and outputting them as the multi-channel digital signals;

a second DAC unit that is coupled to an output of the register bank, and converts the multi-channel digital signals into a plurality of regulation parameters.

Optionally, the feedback circuit comprises:

a first voltage source and a second voltage source that are coupled in series between a power supply terminal and a ground terminal;

a compensation capacitor that is coupled between an intermediate node of the first voltage source and the second voltage source and the ground terminal; and a controlling logic unit that is coupled to the intermediate node, wherein the first voltage source and the second voltage source receive the analog dimming signal and the output feedback signal, respectively, to adjust a voltage across the compensation capacitor, the voltage being output from the controlling logic unit as the reference signal and a first timing signal.

Optionally, the driving signal generation circuit comprises:

a comparator that is coupled to the controlling logic unit, compares the reference signal and the output feedback signal, and outputs a comparison signal;

an on-time delay unit that is coupled to the control logic unit to obtain a delayed second timing signal according to the first timing signal;

a zero-crossing detection unit that is coupled to an AND gate together with the on-time delay unit, the zero-crossing detection unit receiving a voltage signal representing an inductor current and outputting a zero-crossing detection signal when the voltage signal indicates that the inductor current crosses zero, the AND gate receiving the zero-crossing detection signal and outputting a third timing signal after receiving the second timing signal;

a driving logic unit that generates a first control signal according to the comparison signal, the PWM dimming signal, and a maximum on-time signal, and generates a second control signal according to the third timing signal and a maximum off-time signal, and generates the driving signal according to the first control signal and the second control signal to control on and off states of the main power transistor.

Optionally, the driving unit controls an off time of the main power transistor according to the driving signal derived from the first control signal, and controls an on time of the main power transistor according to the driving signal derived from the second control signal.

Optionally, the lighting control circuit further comprises:

a protection circuit that is coupled to the protocol conversion circuit and the driving signal generation circuit, and converts the regulation parameters output from the protocol conversion circuit into physical parameter thresholds, and protects the lighting control circuit when the sampled physical parameters reach the physical parameter thresholds.

Optionally, the protocol conversion circuit converts a fourth-channel digital signal into an over-voltage protection regulation parameter and a fifth-channel digital signal into an over-temperature protection regulation parameter, wherein the protection circuit comprises:

an over-voltage protection unit that obtains at least one over-voltage protection threshold according to the over-voltage protection regulation parameter, and outputs an over-voltage protection signal to the driving signal generation circuit when an output voltage exceeds the over-voltage protection threshold; and an over-temperature protection unit that obtains at least one over-temperature protection threshold according to the over-temperature protection regulation parameter, and outputs an over-temperature protection signal to the driving signal generation circuit when the circuit temperature exceeds the over-temperature protection threshold.

Optionally, the protocol conversion circuit converts the input data signal into the multi-channel digital signals with a single-wire communication protocol or a serial communication protocol, the single-wire communication protocol including unipolar Return-to-Zero coding, non-unipolar Return-to-Zero coding, bipolar Return-to-Zero coding and non-bipolar Return-to-Zero coding.

Optionally, the first-channel digital signal consists of a 1 bit, the second-channel digital signal consists of a 2 bits, the third-channel digital signal consists of 8 bits, the fourth-channel digital signal consists of 2 bits, and the fifth-channel digital signal consists of 2 bits.

According to a second aspect of the present invention, there is provided a lighting control method applied to the lighting control circuit, the lighting control method comprising:

storing input data signal as multi-channel digital signals;

selecting a second-channel digital signal and a third-channel digital signal to be output as a first dimming signal or a third-channel digital signal to be output as a second dimming signal according to a value of a first-channel digital signal;

generating a reference signal according to the second dimming signal and an output feedback signal;

generating a driving signal according to the first dimming signal to control an off time of the main power transistor to achieve a first dimming mode, and generating a driving signal according to the reference signal and the output feedback signal to control an off time of the main power transistor to achieve a second dimming mode.

According to a third aspect of the present invention, there is provided a lighting circuit comprising:

multi-channel LED strings; and the lighting control circuit as mentioned above, which supplies power to the multi-channel LED strings and is used to control a dimming mode of the multi-channel LED strings.

In the lighting control circuit, the lighting control method and the lighting circuit according to the embodiments of the present disclosure, the input data signal is provided to the lighting control circuit with the configured protocol, and is stored as multi-channel digital signals. The dimming mode and the dimming signal in the specific dimming mode are configured according to the multi-channel digital signals to generate different driving signals, so that the lighting control circuit can flexibly select an analog dimming mode or a chopper dimming mode for dimming, and can perform line compensation, to meet the requirements of high frequency applications and low-frequency applications to improve the scope of application of the lighting control circuit.

Further, a plurality of regulation parameters are generated according to the multi-channel digital signals to obtain a plurality of physical parameter thresholds of different physical parameters, so that the protection thresholds of protection units can be adjusted flexibly with more adjustment levels. There is no need to provide a plurality of external resistors, and thus reducing the number of various types of compensation resistors in the circuit or outside the chip, and reducing the number of peripheral devices, and reducing the number of pins, and reducing the circuit size. The chip has improved integration degree and reduced cost. The lighting control circuit can be applied with different dimming modes and with a plurality of protection levels to improve flexibility. Moreover, the input date signal is received through a single pin using either a single-wire communication protocol or a serial communication protocol to adjust various circuits and to achieve a plurality of control functions. Thus, the switching circuit control scheme can be achieved in various modes, by simple operations, with a fast speed, and in an efficient manner, and can replace the PWM modulation perfectly.

DETAILED DESCRIPTION

Preferred embodiments of the present disclosure are described in detail below in conjunction with accompanying drawings, but the present disclosure is not limited to these embodiments. The present disclosure encompasses any substitutions, modifications, equivalents, and solutions made in the spirit and scope of the present disclosure.

In order to give the public a thorough understanding of the present disclosure, specific details are described in the following preferred embodiments of the present disclosure. However, the present disclosure can be fully understood without a description of these details for those skilled in the art.

The present disclosure is described in more detail by way of example in the following paragraphs with reference to the accompanying drawings. It should be noted that the accompanying drawings are in a relatively simplified form and not drawn to accurate scale, and are only used to conveniently and clearly illustrate the purpose of the embodiments of the present disclosure.

Figure 1:
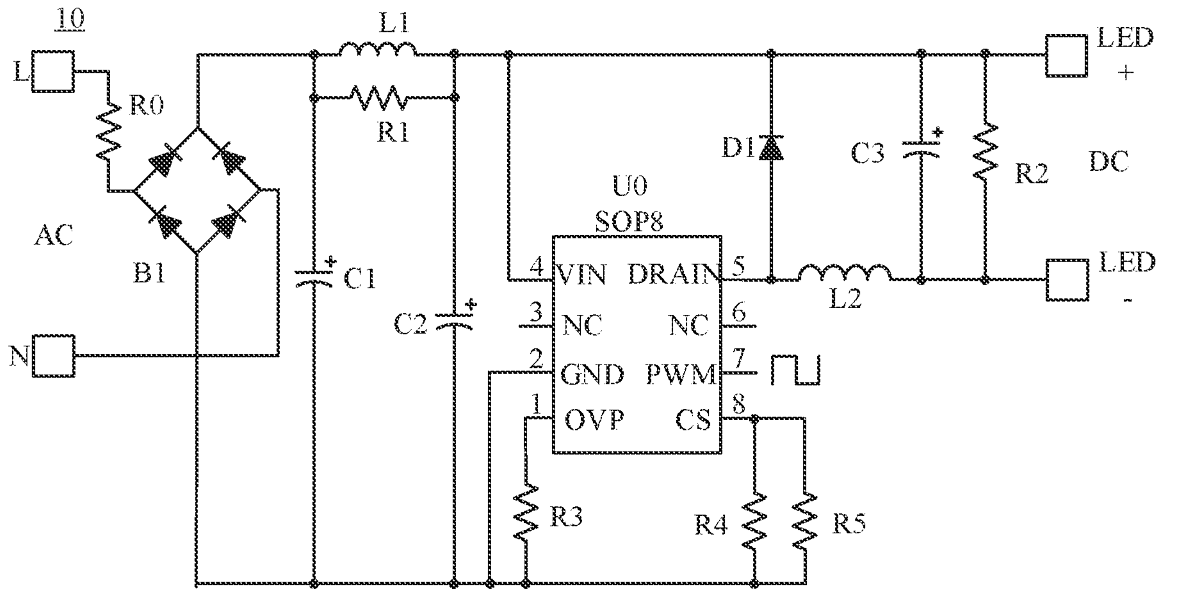
FIG. 1 PRIOR ART
FIG. 1 shows a schematic circuit diagram of a conventional switching power supply.

FIG. 1 shows a schematic circuit diagram of a conventional switching power supply.

As shown in FIG. 1, the switching power supply is based on a buck topology. In addition to the switching circuit, a rectifier bridge B1 is provided as a previous stage, and the LED lamp is a load as a post stage. An AC voltage generated by the AC power supply AC is rectified by the rectifier bridge B1 to generate a DC input voltage. The input voltage is filtered by filter capacitors C1 and C2, the filtered input voltage Vin is provided to a lighting control chip U0 of the switching circuit, and an output voltage Vo which is a DC voltage converted by the switching circuit is provided to the load. For example, the AC voltage is 90-260V and the DC voltage is 80V. The lighting control chip controls on and off states of an internal main power transistor by a control circuit to regulate an output voltage. In FIG. 1, both the control circuit and the main power transistor are located inside the control chip U0.

The control chip U0 includes a plurality of pins, for example, 8 pins. Pin 1 is labeled as OVP and grounded through a resistor R3, which is used to set an OVP level through the resistor for over-voltage protection; Pin 2 is labeled as GND and is grounded; Pin 3 is labeled as NC and is float; Pin 4 is labeled as VIN and is coupled to an input voltage Vin; Pin 5 is labeled as DRAIN and is a drain terminal of the transistor which is connected to a diode DI and an inductor L2. The transistor, the diode DI and the inductor L2 constitute a buck topology, with a capacitor C3 as an output filter capacitor. Pin 6 is labeled as BC and is float; Pin 7 is labeled as PWM and receives an input signal, that is, a PWM control signal, to control the operation of circuits inside the chip; Pin 8 is labeled as CS and is a sampling pin, which is grounded through resistors R4 and R5, for sampling a source voltage of the transistor. Internal circuits are regulated accordingly. Pin 3 can also be labeled as COMP, which is grounded through an external compensation resistor; Pin 6 can also be labeled as FB and receives a feedback signal to adjust an output voltage. When Pin 3 and Pin 6 are configured in such manner, all of the 8 pins of the control chip U0 are used, and there are more external resistors.

The switching power supply controls operation states of the switching circuit with the lighting control chip. A PWM dimming signal is input through a single wire. It can only support a single dimming mode, and is not compatible with both chopper dimming and analog dimming, and has fixed line voltage compensation, and is not compatible with both low-frequency applications and high-frequency applications; moreover, external pins and resistors are needed for setting an OVP level or an OTP point and an OTP slope. There are more peripheral devices being used, more functional pins being occupied, less OTP and OVP protection levels being given. The protection threshold has a fixed value, which means that the over-threshold protection of the chip is not flexible; Moreover, various switching circuits are not easily compatible with each other at the same time. An on time has a fixed value, which means that the current curve performs poorly.

The present disclosure improves internal circuits of the lighting control chip in the above switching power supply, so that it can flexibly achieve various and multi-level over-threshold protections even without external compensation resistors, and can be applied to various switching circuits and a various dimming modes. The following is detailed in conjunction with the accompanying drawings.

Figure 2:
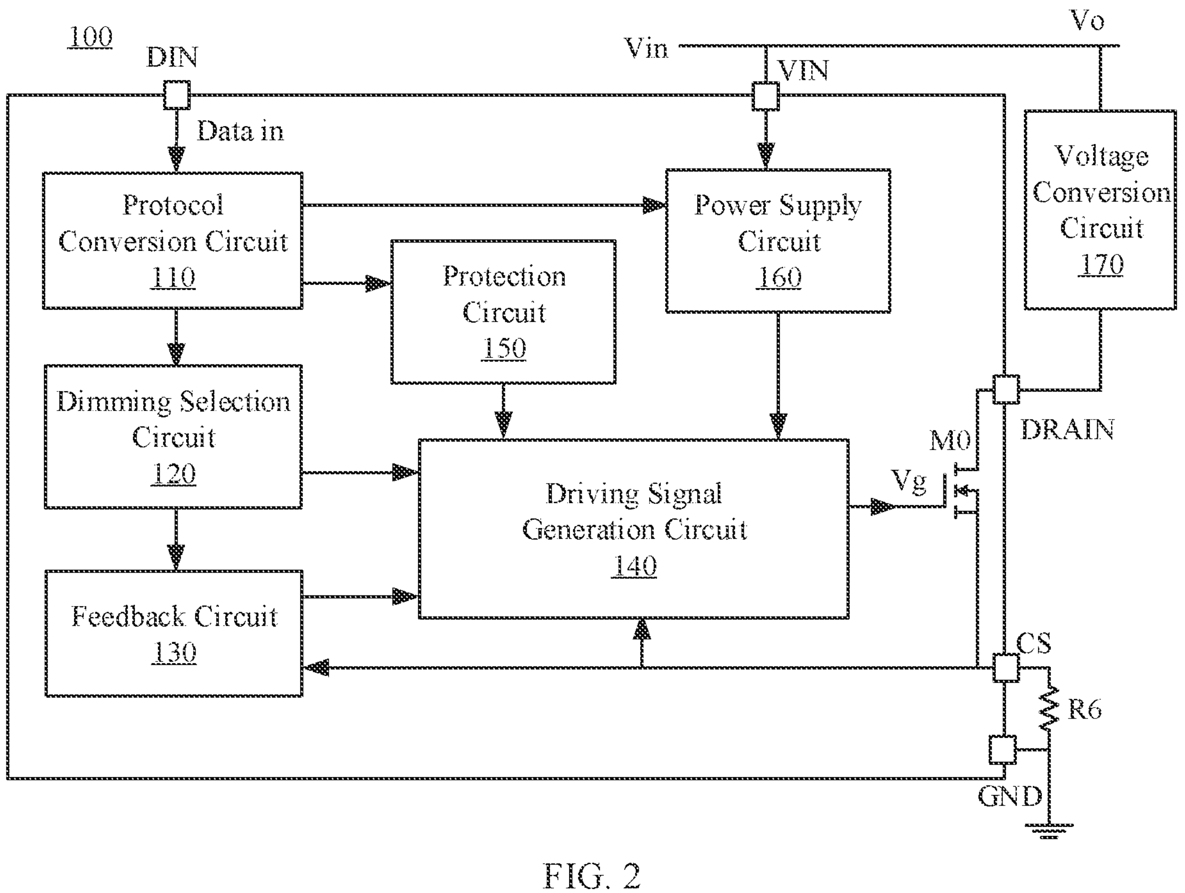
FIG. 2 shows a schematic circuit block diagram of a lighting control circuit according to an embodiment of the present disclosure.

FIG. 2 shows a schematic circuit block diagram of a lighting control circuit according to an embodiment of the present disclosure.

As shown in FIG. 2, a lighting control circuit 100 according to the embodiment of the present disclosure includes: a main power transistor M0, a protocol conversion circuit 110, a dimming selection circuit 120, a feedback circuit 130, a driving signal generation circuit 140, a protection circuit 150, and a power supply circuit 160. Here, the protocol conversion circuit 110 stores input data signal Data in (B0-B15) having been received as multi-channel digital signals (B0, B1-B2, B3-B10 . . . B15); The dimming selection circuit 120 is coupled to the protocol conversion circuit 110, and selects and outputs a second-channel digital signal (B1-B2) and a third-channel digital signal (B3-B10) as a first dimming signal, or selects and outputs a third-channel digital signal to be output as a second dimming signal, according to a value of the first-channel digital signal (B0). The feedback circuit 130 is coupled to the dimming selection circuit 120 to generate a reference signal Vref according to the second dimming signal and an output feedback signal Vcs; The driving signal generation circuit 140 is coupled to the dimming selection circuit 120, the feedback circuit 130, and a control terminal of the main power transistor M0, and controls an off time of the main power transistor M0 according to the first dimming signal to achieve the first dimming mode, and generates a driving signal Vg according to the reference signal Vref and the output feedback signal Ves to control an off time of the main power transistor M0 to achieve the second dimming mode.

The protection circuit 150 is coupled to the protocol conversion circuit 110 and the driving signal generation circuit 140, to obtain at least one physical parameter threshold corresponding to various physical parameters being sampled according to a plurality of regulation parameters output from the protocol conversion circuit 110, and to protect the lighting control circuit 100 in a case that the sampled physical parameters reach corresponding ones of the physical parameter thresholds. The power supply circuit 160 receives the input voltage Vin, converts it to a power supply voltage, and supplies it to the driving signal generation circuit 140 and other circuits.

In FIG. 2, the lighting control circuit 100 can be packaged within a chip and communicates with external components through a plurality of pins. For example, the protocol conversion circuit 110 receives the input data signal Data in through the Pin DIN; the Pin GND is grounded; the driving signal generation circuit 140 is coupled to the control terminal of the main power transistor M0. A source of the main power transistor M0 is coupled to an external resistor R6 through the Pin CS, and then is grounded. A drain of the main power transistor M0 is coupled to an external voltage conversion circuit 170 through the Pin DRAIN. The voltage conversion circuit 170 may be a switching circuit that converts the input voltage Vin into the output voltage Vo and provides it to the post-stage load. The feedback circuit 130 samples the current flowing through the main power transistor M0 through the Pin CS to generate the output feedback signal Vcs. The power supply circuit 160 samples the input voltage Vin through the Pin VIN.

The lighting control circuit 100 according to this embodiment receives the input data signal and stores it as multi-channel digital signals according to the protocol having been configured. In a case that the load is a lighting device such as an LED lamp, different dimming modes different dimming signals are selected and output according to the multi-channel digital signals to adjust the driving signal to control dimming brightness and dimming depth, etc. . . . It can also generate a plurality of regulation parameters according to the multi-channel digital signals, and obtain the physical parameter thresholds corresponding to various physical parameters according to the plurality of regulation parameters. For example, it can obtain multi-level protection thresholds according to the protocol, so that it is unnecessary to provide various types of compensation resistors on the periphery of the circuit, which reduce the number of the peripheral components of the circuit, thereby reducing the cost. Therefore, different parameters of various circuits can be adjusted according to different digital signals, so that the functions of various circuit can be improved. The lighting control circuit can be applied to different circuit structures to supply power to different loads and improve applicability.

Figure 3:
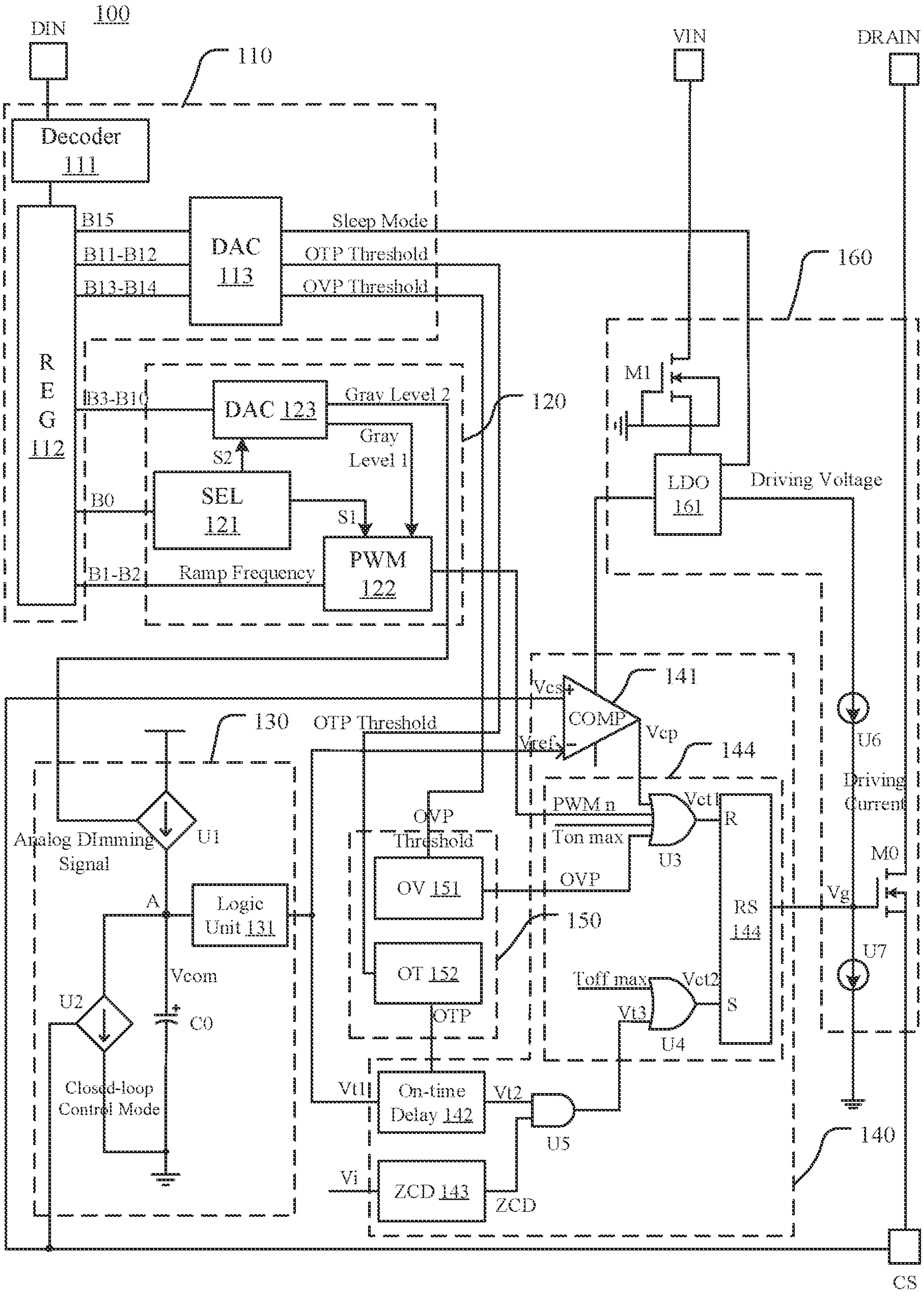
FIG. 3 shows a schematic circuit diagram of various circuits in the lighting control circuit shown in FIG. 2.

FIG. 3 shows a schematic circuit diagram of various circuits in the lighting control circuit shown in FIG. 2.

As shown in FIG. 3, the protocol conversion circuit 110 includes a decoder 111, a register bank 112, and a DAC unit 113, and the decoder 111 receives the input data signal Data in and decodes it so that it is transmitted in a plurality of bits. The register bank 112 includes a plurality of registers that sequentially store a plurality of bits and output the plurality of bits as multi-channel digital signals according to a pre-configured single-wire transmission protocol, such as a single-wire communication protocol or a serial communication protocol. The number of registers matches the bits of the transmitted data. As an example, the transmitted data is 16 bits. The register bank 112 includes, for example, 16 registers, each register stores one bit and the data output by different numbers of registers is combined into one-channel digital signal.

In the protocol conversion circuit 110, when a single-wire communication protocol is used, the register bank 112 outputs 6-channel digital signals, for example, where the first-channel digital signal is B0, which contains one bit, occupies 1 bit of space, and is output by one register; The second-channel digital signal is B1-B2, contains two bits, occupies 2 bits of space, and is output by two registers; Similarly, the third-channel digital signal is B3-B10, which contains 8 bits and occupies 8 bits of space. The fourth-channel digital signal is B11-B12, which contains 2 bits. The fifth-channel digital signal is B13-B14, which contains 2 bits. The sixth-channel digital signal is B15. Here, the protocol conversion circuit 110 outputs 6-channel digital signals for example, and the corresponding input data signal is decoded as a continuous 16 bits. In fact, the order of various digital signals can be changed, for example, B15 can be set as the first-channel digital signal, B13-B14 can be set as the second-channel digital signal, and B3-B10 can be set as the third-channel digital signal. The 6-channel digital signals correspond to the input data signal which contains 16 bits after been decoded. The number of bits here can be configured according to the content of the protocol and the functions to be implemented. For example, when the circuit or chip only needs the functions corresponding to the previous three-channel digital signals, the protocol can be reconfigured so that the protocol only carries the information corresponding to the first-channel to three-channel digital signals. In such case, it needs only the input data signal of 11 bits to be provided. Further, the DAC unit 113 is coupled to an output of the register bank 112 for converting the multi-channel digital signals into a plurality of regulation parameters. The plurality of regulation parameters are analog parameters converted from digital signals. For example, the sixth-channel digital signal needs to be converted into three different regulation parameters of analog parameters, which are used to adjust different parameters of various circuits and achieve various functions.

Further, the input data signal contains data bits and flag bits. Upon receiving the decoded input data signal, the register bank 112 firstly latches data of the data bits, and after receiving the flag bits, outputs the input data signal to the DAC unit 113, which is used to convert the digital signal into an analog signal.

The dimming selection circuit 120 includes a dimming mode selection unit 121, a PWM generator 122, and a DAC unit 123. The dimming mode selection unit 121 outputs a first selection signal S1 or a second selection signal S2 according to a value of the received first-channel digital signal B0 to configure a dimming mode; Under the control of the second selection signal S2, the DAC unit 123 converts the third-channel digital signal B3-B10 into two brightness regulation parameters, which are analog parameters, namely Gray Level 1 and Gray Level 2, respectively. Gray Level 2 is output as the second dimming signal, which is an analog dimming signal, and Gray Level 1 is fed into the PWM generator 122; Under the control of the first selection signal SI, the PWM generator 122 receives the brightness regulation parameter Gray Level 1 and the second-channel digital signal B1-B2 to output a first dimming signal, which is a PWM dimming signal. Actually, the DAC unit 123 can be combined with the DAC unit 113 in the protocol conversion circuit 110 as one DAC converter.

The first-channel digital signal B0 contains 1 bit. For example, when it is 0, the dimming mode selection unit 121 outputs the first selection signal S1. The load is dimmed in a first dimming mode, which is a chopper dimming mode; when the first-channel digital signal B0 is 1, the dimming mode selection unit 121 outputs the second selection signal S2. The load is dimmed in a second dimming mode, which is an analog dimming mode. The third-channel digital signal B3-B10 contains 8 bits, which can represent 0-255 brightness levels, and thus the dimming depth is 0.4%. The second-channel digital signal B1-B2 contains 2 bits and has four levels of outputs, 00, 01, 10 and 11, which can represent different chopping frequency information.

Figure 4:
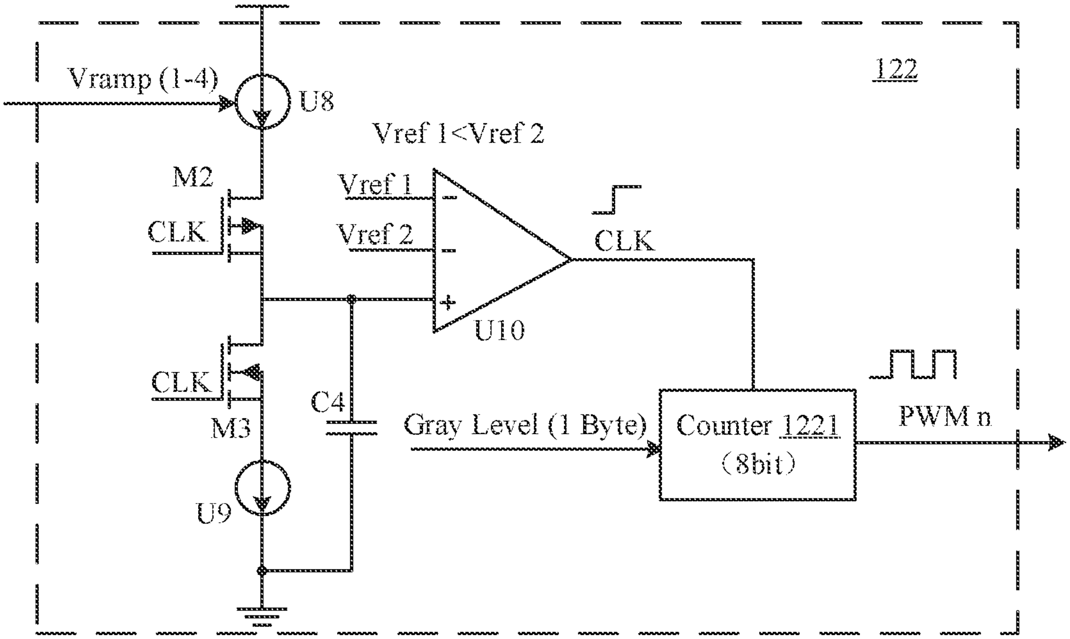
FIG. 4 shows a schematic circuit diagram of the PWM generator shown in FIG. 3.

FIG. 4 shows a schematic circuit diagram of the PWM generator shown in FIG. 3; As shown in FIG. 4, the PWM generator 122 includes a PMOS transistor (M2) and an NMOS transistor (M3) that is connected in series between a power supply terminal and a ground terminal, a current source U8 that is connected between the PMOS transistor and the power supply terminal, another current source U9 that is connected between the NMOS transistor and the ground terminal, and a capacitor C4 that is connected between an intermediate node of the PMOS transistor and the NMOS transistor and the ground terminal. Frequency information Vramp1-4 is fed to the current source U8 to adjust the signals at the intermediate node of the PMOS transistor and the NMOS transistor. The signal at the node are transmitted to a comparator U10, and compared with a first reference value Vref1 and a second reference value Vref2, which are predetermined, to generate a clock signal CLK. The frequencies of the 4 clock signals corresponding to the 4 frequency information are, for example, 500 Hz, 1 kHz, 2 kHz and 4 kHz, respectively. The brightness regulation parameter Gray Level 1 (1 byte) is transmitted to the 8-bit counter 1221, and the clock signal CLK is also transmitted to the counter, thereby obtaining a PWM dimming signal that represents a certain brightness value, i.e. PWMn, and thereby realizing the chopper dimming of the circuit.

Continuing with reference to FIG. 3, the feedback circuit 130 adjusts a value of the reference signal Vref according to the second dimming signal Gray level to adjust an off time of the main power transistor M0, thereby adjusting a peak value of the current flowing through the main power transistor M0; The driving signal generation circuit 140 adjusts a duty cycle of a driving signal Vg according to the first dimming signal PWMn to adjust a value of the current flowing through the main power transistor M0. In this embodiment, the feedback circuit 130 includes a first voltage source U1 and a second voltage source U2 that are connected in series between the power supply terminal and the ground terminal, a compensation capacitor C0 that is connected between an intermediate node A of the first voltage source U1 and the second voltage source U2 and the ground terminal, and a control logic unit 131 that is connected to the node A. Here, the first voltage source U1 and the second voltage source U2 receive an analog dimming signal and an output feedback signal Vcs, respectively, to adjust a voltage Vcom across the compensation capacitor C0. A control logic unit 131 outputs a reference signal Vref and a first timing signal Vt1.

Further, the driving signal generation circuit 140 includes a comparator 141, an on-time delay unit 142, a zero-crossing detection unit 143, an AND gate U5 and a driving logic unit 144. The comparator 141 is coupled to the control logic unit 131, the reference signal Vref and the output feedback signal Vcs are compared, and the comparison signal Vcp is output; The on-time delay unit 142 is connected to the control logic unit 131 to obtain the delayed second timing signal Vt2 according to the first timing signal Vt1; The zero-crossing detection unit 143 receives a voltage signal Vi representing an inductor current, and outputs a zero-crossing detection signal ZCD when the voltage signal Vi indicates that the inductor current cross zero; The zero-crossing detection unit 143 and the on-time delay unit 142 are respectively coupled to two inputs of the AND gate U5. The AND gate U5 waits for the second timing signal after receiving the zero-crossing detection signal ZCD, and outputs the third timing signal Vt3 after receiving the second timing signal Vt2 to control the conduction of the main power transistor M0. The driving logic unit 144 includes a plurality of logic gates and an RS flip-flop, generating a first control signal Vctr1 according to the comparison signal Vcp, the PWM dimming signal PWMn, and the maximum on-time signal Ton max, a second control signal Vctr2 according to the third timing signal Vt3, and the maximum off-time signal Toff max, and generating a driving signal Vg according to the first control signal Vctr1 and the second control signal Vctr2 to control on and off states of the main power transistor M0.

Specifically, the logic unit includes a first OR gate U3 and a second OR gate U4. An output of the AND gate U5 and a maximum off-time signal Toff max is coupled to an input of the second OR gate U4. The maximum off-time signal Toff max is, for example, generated by a timer. An output of the second OR gate U4 outputs a second control signal Vctr2. An output of the comparator 141, an output of the PWM generator 122, and a maximum on-time signal Ton max are all coupled to an input of the first OR gate U1. The maximum on-time signal Ton max is generated by a timing unit such as a timer. An output of the first OR gate U3 outputs the first control signal Vctr1. An output of the first OR gate U3 is coupled to a reset terminal R of the RS flip-flop, and an output of the second OR gate U4 is coupled to a set terminal S. In one embodiment, the lighting control unit is a control unit of the main power transistor of a flyback converter or an active clamping converter, in a peak current control mode. The on-time delay unit 142 is used to set an oscillation time in a DCM mode, and the comparator 141 is used to control a peak value of the inductor current. Then, the driving unit mainly controls an off time of the main power transistor M0 according to the driving signal Vg derived from the first control signal Vctr1 and an on time of the main power transistor M0 according to the driving signal Vg derived from the second control signal Vctr2.

Thus, in this embodiment, the control circuit 120 can control an output current of the lighting control circuit, achieves line compensation, extends to high-frequency and low-frequency applications of the circuit. Moreover, the dimming mode can be flexibly switched, and is compatible with analog dimming and chopper dimming. The reliability of the circuit can be improved.

Further, in FIG. 3, a protection circuit 150 is coupled to a protocol conversion circuit 110 and a driving signal generation circuit 140, and includes an over-voltage protection unit 151 and an over-temperature protection unit 152. The protection circuit 150 obtains at least one physical parameter threshold corresponding to each sampled physical parameter according to a plurality of regulation parameters output from the protocol conversion circuit 110, and protects the lighting control circuit when the sampled physical parameter reaches the corresponding physical parameter threshold. For example, the protocol conversion circuit converts the fourth-channel digital signal into an over-voltage protection regulation parameter and the fifth-channel digital signal into an over-temperature protection regulation parameter. Specifically, an over-voltage protection unit 151 converts an over-voltage protection regulation parameter into an over-voltage protection threshold. Different values (00, 01, 10, 11) can be configured according to the protocol, so it can be converted into one or more protection thresholds. When the output voltage exceeds an over-voltage protection threshold, the over-voltage protection signal is output to the first OR gate U3 of the driving signal generation circuit 140 to control an off time of the main power transistor M0; Similarly, an over-temperature protection unit 152 converts an over-temperature protection regulation parameter OTP Threshold to an over-temperature protection threshold, outputs an over-temperature protection signal OTP to the on-time delay unit 142 of the driving signal generation circuit 150 when the circuit temperature exceeds the over-temperature protection threshold, and controls an on time of the main power transistor M0. In some embodiments, the protection circuit 150 may also include an under-voltage protection unit, an over-current protection unit, etc. According to the protocol configuration, a plurality of protection thresholds can be set for the protection circuit 150 without external compensation resistors.

Figure 5:
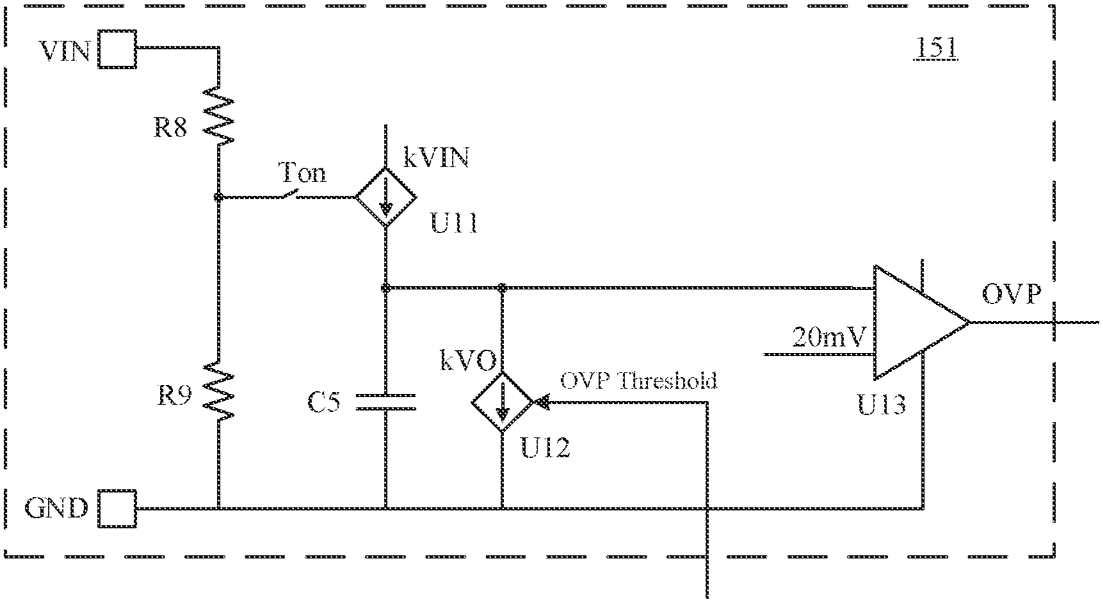
FIG. 5 shows a schematic circuit diagram of an over-voltage protection unit shown in FIG. 3.

FIG. 5 shows a schematic circuit diagram of an over-voltage protection unit shown in FIG. 3. As shown in FIG. 5, an over-voltage protection unit 151 includes a resistor R8 and a resistor R9 that are coupled in series between a power supply terminal and a ground terminal. An intermediate node of the two resistors are coupled to an input of a current-controlled voltage source U11 through a switch Ton. The current-control voltage sources U11 and U12 are coupled in series. A capacitor C5 is coupled between an intermediate node of the current-control voltage sources U11 and U12 and the ground terminal. The current-control voltage source U11 indicates an input signal kVIN. The current-control voltage source U12 indicates an output signal kVO. The signal at the intermediate node of the current-control voltage sources U11 and U12 is output to one input of the comparator U13. The other input of the comparator U13 is coupled to a fixed threshold, such as a voltage of 20 mV. An OVP signal is output from its output terminal. It can be understood that the comparator compares the kVO signal with the fixed threshold of 20 mV, and an input of the current control voltage source U12 is coupled to the over-voltage protection regulation parameter OVP Threshold to adjust the kVO signal that represents the output voltage, so that a comparison result of the comparator can be changed. That is, a threshold of over-voltage protection is adjusted by the over-voltage protection regulation parameter OVP Threshold, which provides better protection to the circuit.

Therefore, by converting the multi-channel digital signals into different regulation parameters to obtain the protection threshold of various physical parameters, there is no need to provide compensation resistor outsides the circuit, and a plurality of levels (n-bit number can represent 2^n levels) regulation is possible. The thresholds can be flexibly configured and can be applied to different applications.

Continuing to refer to FIG. 3, a power supply circuit 160 includes a transistor M1 and an LDO161. one terminal of the transistor M1 is coupled to an input terminal VIN, another terminal is coupled to the LDO161, the control terminal is grounded. The LDO161 is used to regulate the input voltage and provide a supply voltage to various circuits. For example, the LDO161 provides a driving voltage to the main power transistor M0. Further, the power supply circuit 160 further includes a pull-up current source U6 and a pull-down current source U7 to provide a driving current for the main power transistor M0, and a current of the main power transistor M0 can be adjusted by adjusting the driving current and the driving voltage.

The sixth-channel digital signal is B15, which can be converted into a standby regulation parameter by the DAC unit 113. For example, when its value is 0, it indicates that it is necessary to enter a sleep mode, with a Sleep Mode signal being issued for controlling the LDO161 or other circuit units to be shut down or enter a sleep mode to reduce power consumption.

The above-described input data signal of this embodiment are implemented in a single-wire communication protocol configuration. The single-wire communication protocol may include unipolar Return-to-Zero coding, non-unipolar Return-to-Zero coding, bipolar Return-to-Zero coding, and non-bipolar Return-to-Zero coding. Alternatively, the above input data signal of this embodiment can also be implemented in a serial communication protocol configuration. The serial communication protocol typically operates in a full duplex communication mode, but in a simplex communication mode in this embodiment. The MCU issues a command to configure the protocol and transmits it to the lighting control circuit. The protocol configuration can be referred to the above configuration of the single-wire communication protocol to achieve the same operation and beneficial effect as the Return-to-Zero coding.

The control circuit of this embodiment uses a configured protocol to provide the input data signal to the lighting control circuit through a single pin, and stores it as multi-channel digital signals. According to the multi-channel digital signals, the dimming modes and the dimming signal under the specific dimming mode are configured to generate different driving signals, so that the lighting control circuit can flexibly select a chopper dimming or an analog dimming mode and can perform line compensation, to meet the application requirements at high and low frequencies to improve the scope of application of the lighting control circuit. According to the multi-channel digital signals, multiple regulation parameters are generated to obtain different physical parameter thresholds, so that the protection thresholds of various protection unit can be adjusted flexibly. There are more regulation levels. There is no need for a plurality of external resistors, reducing the number of various types of compensation resistors at the periphery of the circuit or chip, reducing peripheral devices, occupying fewer pins, reducing circuit size, improving integration degree of the chip, and reducing costs.

Further, the present disclosure further provides a lighting control method, which is applied to the lighting control circuit of the above embodiment, the lighting control method comprising: storing input data signal as multi-channel digital signals; selecting a second-channel digital signal and a third-channel digital signal to be output as a first dimming signal or a third-channel digital signal to be output as a second dimming signal according to a value of a first-channel digital signal; generating a reference signal according to the second dimming signal and the output feedback signal; controlling an off time of the main power transistor according to the first dimming signal to achieve a first dimming mode, and controlling an off time of the main power transistor according to the reference signal and the output feedback signal to achieve a second dimming mode.

FIGS. 6*a*-6*d* show schematic waveforms of different types of single-wire protocols according to various embodiments of the present disclosure.

Figure 6A:
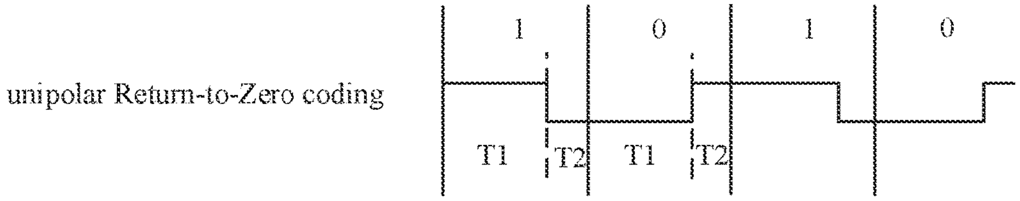
FIGS. 6*a*-6*d* show schematic waveforms of different types of single-wire protocols according to various embodiments of the present disclosure.

Referring to FIG. 6*a*, there is shown waveform of unipolar Return-to-Zero coding. In the figure, the waveform of 4 bits of data is given. For one bit, it can be divided into T1 and T2. T1 occupies a time period longer than T2. When an absolute value of T1 is greater than T2, the bit is high, and the corresponding output is 1. When an absolute value of T1 is less than T2, the bit is low, and the corresponding output is 0.

Figure 6B:
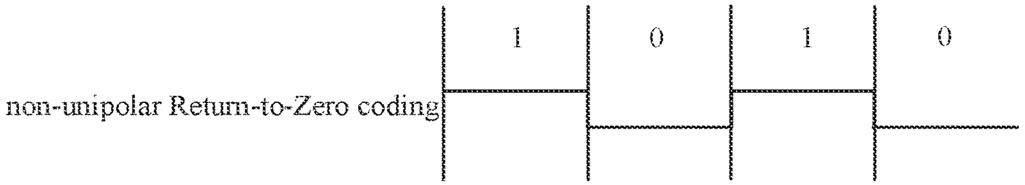

As shown in FIG. 6*b*, there is shown unipolar non-Return-to-Zero coding, and also contains 4 bits. Determination of a value of each bit is shown in FIG. 6*a*.

Figure 6C:
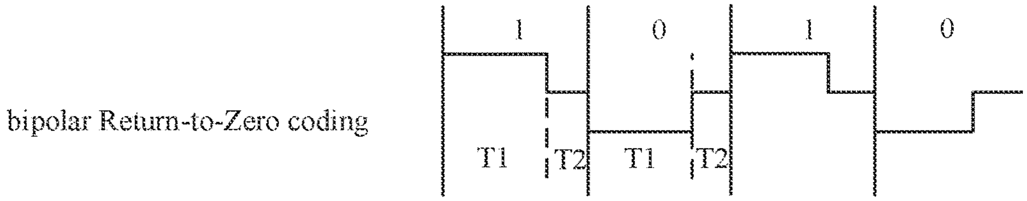
Figure 6D:
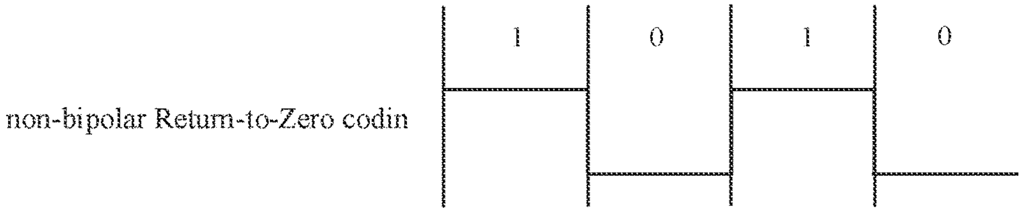

Similarly, FIGS. 6*c* and 6*d* show waveforms of bipolar Return-to-Zero coding and non-bipolar Return-to-Zero coding, respectively, each of which contains 4 bits, and determination of a value of each bit is the same as that of FIG. 6*a*. For the input data signal of this embodiment, whether it is a single-wire communication protocol or a serial communication protocol, the determination of the value of each bit (in encoding and decoding manner) in the data transmission process is the same as that in FIG. 6*a*.

Figure 7:
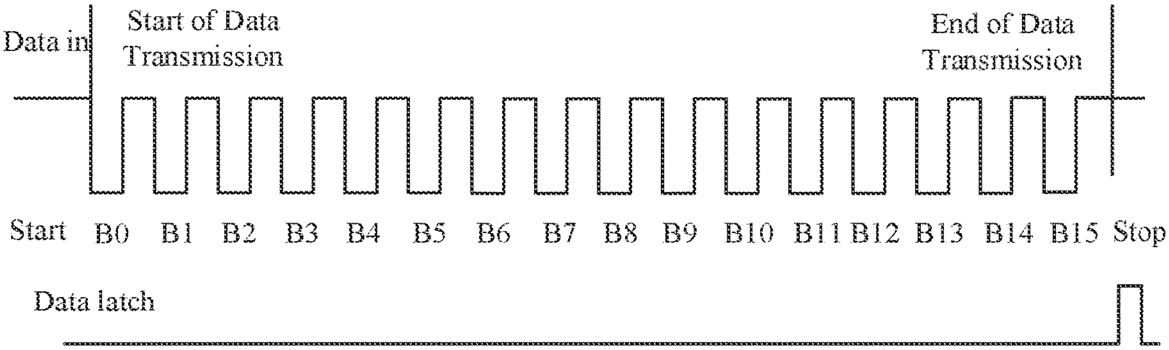
FIG. 7 shows an exemplary waveform diagram of an input data signal received by a lighting control circuit according to an embodiment of the present disclosure.

FIG. 7 shows an exemplary waveform diagram of an input data signal received by a lighting control circuit according to an embodiment of the present disclosure.

As shown in FIG. 7, a schematic waveform of effective data bits of the input data signal is shown. When the input data signal is configured as a serial communication configuration, one-way data transmission is supported by simplex data transmission, from an MCU to the lighting control circuit of this embodiment. A data packet of the serial communication protocol contains a start bit, data bits, a check bit and a stop bit. FIG. 7 shows waveform of the data bits. When the input data signal is implemented using the single-wire communication protocol, FIG. 7 shows transmission waveform of the effective data bits.

Specifically, in FIG. 7, the number of registers is equal to the bits of the transmitted data. As an example of transmitting data of 16 bits (B0-B15), the transmission process of the input data signal is as follows: an external MCU (microcontroller) sends an input data signal with cycles of 1.25 uS for each bit, when the chip receives a high level period exceeding 1.25 uS, it is determined that a Start signal starts, that is, the data transmission is about to start, and a first falling edge after receiving the input data signal indicates that the first bit starts transmission. In a bit, when a low level period is less than a high level period, it is determined to be 1, and when a low level period is greater than a high level period, it is determined to be 0. A 19-bit register is used for storing data of various bit in sequence. When the chip receives a high level again for more than 1.25 uS, it means that the chip receives a Stop signal, that is, the data transmission is finished. During data transmission, the chip locks all of the data of the register into a latch. When a Stop signal is received, a Data latch signal is generated with a rising edge. At this time, the register outputs the data to the DAC unit. The DAC unit then converts the digital signal into an analog signal and sends it to various functional units of the control circuit. The register transmits the data serially by shifting. B0 is used to set a dimming mode, B1-B2 is used to set a chopping frequency, B3-B10 indicate brightness information of 0-255, B11-B12 indicate an over-voltage protection threshold, B13-B14 indicate an over-temperature protection threshold, and B15 is used to set a standby mode, which is the same as the description of the above embodiment.

Figure 8:
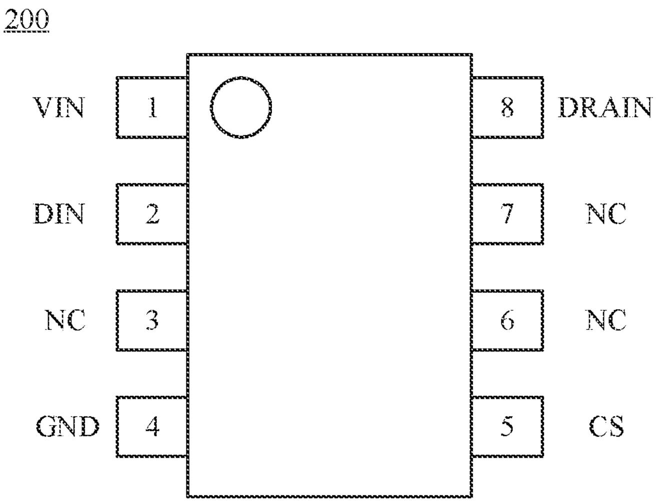
FIG. 8 shows a schematic diagram of a lighting control chip according to an embodiment of the present disclosure.

FIG. 8 shows a schematic diagram of a lighting control chip according to an embodiment of the present disclosure.

As shown in FIG. 8, a lighting control chip 200 is disclosed. The lighting control chip 200 includes the lighting control circuit 100 of the above embodiment. Actually, the chip 200 is a package structure of the above circuit 100. According to FIGS. 2-3, the control chip 200 can include 8 pins, where Pin 1 is a VIN pin to receive an input voltage VIN; Pin 2 is a DATA pin, which receives the input data signal; Pin 3 is an NC pin, that is, a float pin; Pin 4 is a GND pin, coupled to a reference ground; Pin 5 is a CS pin, sampling a source voltage of the transistor M0; Pin 6 is an NV pin, which is float, and which can also be used as an SCL pin to receive a clock signal in a case that the input data signal using a two-wire communication protocol; Pin 7 is an NC pin; Pin 8 is a DRAIN pin, which is coupled to a drain of the main power transistor M0. The lighting control chip according to this embodiment does not need external compensation resistors. Compared with the chip shown in FIG. 1, the number of empty pins has increased, the number of peripheral devices is decreased, and integration degree is increased. At the same time, flexible configuration of the OTP point and the OTP slope can be realized.

Figure 9:
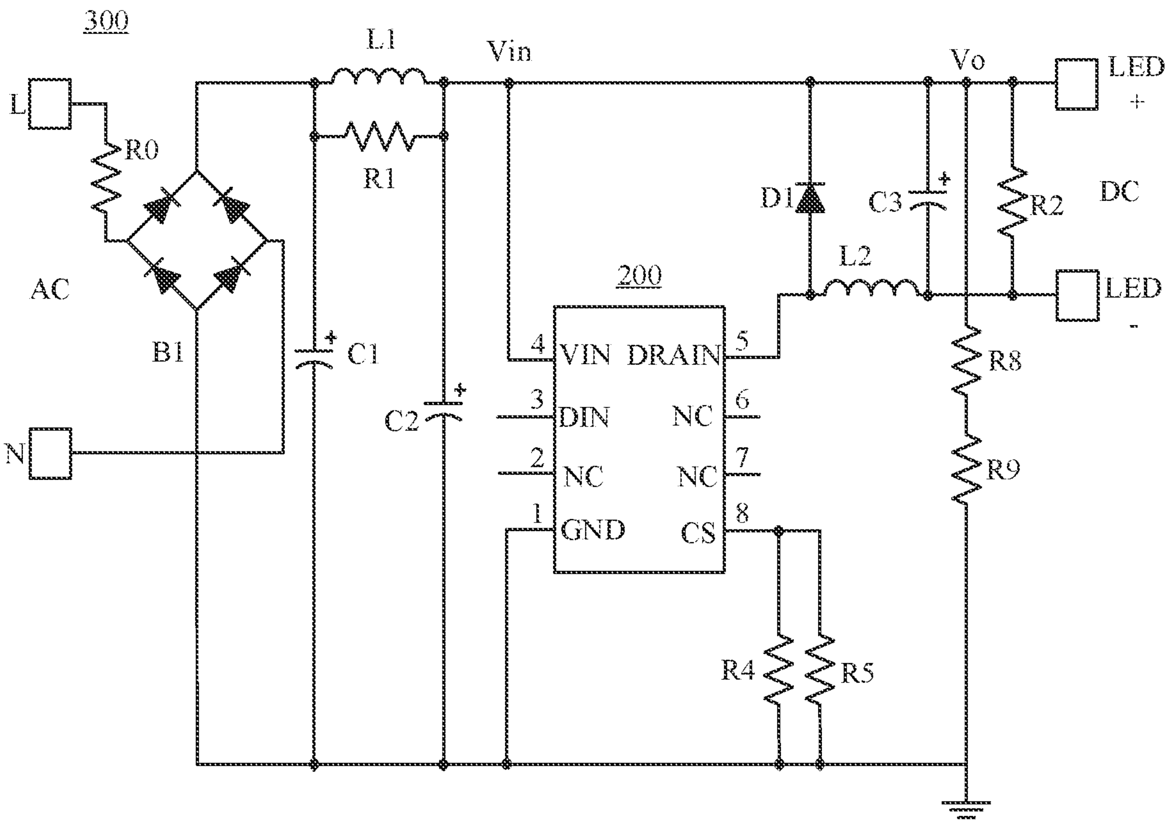
FIG. 9 shows a schematic circuit diagram of a switching power supply according to an embodiment of the present disclosure.

FIG. 9 shows a schematic circuit diagram of a switching power supply according to an embodiment of the present disclosure.

As shown in FIG. 9, a switching power supply 300 is provided, including the lighting control chip 200 shown in FIG. 8, a rectifier bridge B1, and a buck topology. Here, the rectifier bridge rectifies an AC voltage into an input voltage Vin and provides it to the lighting control chip 200; The lighting control chip 200 controls an operation state of the main power transistor M0 in the switching circuit. The buck topology of the switching circuit includes a main power transistor M0, a diode DI, and an inductor L2. Apparently, the buck topology is described as an example in this embodiment. The switching circuit of this embodiment can also be a boost topology or other type of topology. The input voltage Vin is converted to the output voltage Vo by the switching circuit to supply power to a post-stage load.

Further, the present disclosure further provides an lighting circuit which includes multi-channel LED lamp strings and the above-described switching power supply 300. The switching power supply 300 includes the above-described control circuit 100 which supplies power to the multi-channel LED lamp strings and is used to control a dimming mode of the multi-channel LED lamp strings.

To sum up, in the lighting control circuit, the lighting control method and the lighting circuit according to the embodiments of the present disclosure, the input data signal is provided to the lighting control circuit with the configured protocol, and is stored as multi-channel digital signals. The dimming mode and the dimming signal in the specific dimming mode are configured according to the multi-channel digital signals to generate different driving signals, so that the lighting control circuit can flexibly select an analog dimming mode or a chopper dimming mode for dimming, and can perform line compensation, to meet the requirements of high frequency applications and low-frequency applications to improve the scope of application of the lighting control circuit.

Further, a plurality of regulation parameters are generated according to the multi-channel digital signals to set different physical parameter thresholds, so that the protection thresholds of protection units can be adjusted flexibly with more adjustment levels. There is no need to provide a plurality of external resistors, and thus reducing the number of various types of compensation resistors outside the circuit or the chip, and reducing the number of peripheral devices, and reducing the number of pins, and reducing the circuit size. The chip has improved integration degree and reduced cost. The lighting control circuit can be applied with different dimming modes and with a plurality of protection levels to improve flexibility. Moreover, either a single-wire communication protocol or a serial communication protocol is used to adjust various circuits and to achieve a plurality of control functions. Thus, the switching circuit control scheme can be achieved in various modes, by simple operations, with a fast speed, and in an efficient manner, and can replace the PWM modulation perfectly.

The above-described embodiments do not constitute a limitation on the scope of protection of the technical solution. Any modifications, equivalent substitutions, improvements, etc. made within the spirit and principles of the above embodiments shall be included in the scope of protection of this technical solution.

What is claimed is:

1. A lighting control circuit, comprising:

a main power transistor;

a protocol conversion circuit that stores received input data signal as multi-channel digital signals;

a dimming selection circuit that is coupled to the protocol conversion circuit, and selects a second-channel digital signal and a third-channel digital signal to be output as a first dimming signal or a third-channel digital signal to be output as a second dimming signal according to a value of a first-channel digital signal;

a feedback circuit that is coupled to the dimming selection circuit and generates a reference signal according to the second dimming signal and an output feedback signal; and a driving signal generation circuit that is coupled to the dimming selection circuit, the feedback circuit, and a control terminal of the main power transistor, and generates a driving signal according to the first dimming signal to control an off time of the main power transistor to achieve a first dimming mode, and generates a driving signal according to the reference signal and the output feedback signal to control an off time of the main power transistor to achieve a second dimming mode, wherein the first dimming mode is a chopper dimming mode, the second dimming mode is an analog dimming mode, the first dimming signal is a PWM dimming signal, and the second dimming signal is an analog dimming signal.

2. The lighting control circuit according to claim 1, wherein the driving signal generation circuit adjusts a duty ratio of the driving signal according to the first dimming signal to adjust a value of a current flowing through the main power transistor; and the feedback circuit adjusts an off time of the main power transistor by adjusting a value of the reference signal according to the second dimming signal to adjust a peak value of a current flowing through the main power transistor.

3. The lighting control circuit according to claim 1, wherein the dimming selection circuit comprises:

a dimming mode selection unit that outputs a first selection signal or a second selection signal according to a value of the received first-channel digital signal for configuring a dimming mode;

a first DAC unit that converts the third-channel digital signal into the analog dimming signal and a brightness regulation parameter according to the second selection signal; and a PWM generator that receives the second-channel digital signal and the brightness regulation parameter to output the PWM dimming signal according to the first selection signal.

4. The lighting control circuit according to claim 1, wherein the protocol conversion circuit comprises:

a decoder that decodes the input data signal for transmission in a plurality of bits;

a register bank that has a plurality of registers for sequentially storing a plurality of bits and outputting them as the multi-channel digital signals;

a second DAC unit that is coupled to an output of the register bank, and converts the multi-channel digital signals into a plurality of regulation parameters.

5. The lighting control circuit according to claim 1, wherein the feedback circuit comprises:

a first voltage source and a second voltage source that are coupled in series between a power supply terminal and a ground terminal;

a compensation capacitor that is coupled between an intermediate node of the first voltage source and the second voltage source and the ground terminal; and a controlling logic unit that is coupled to the intermediate node, wherein the first voltage source and the second voltage source receive the analog dimming signal and the output feedback signal, respectively, to adjust a voltage across the compensation capacitor, the voltage being output from the controlling logic unit as the reference signal and a first timing signal.

6. The lighting control circuit according to claim 5, wherein the driving signal generation circuit comprises:

a comparator that is coupled to the controlling logic unit, compares the reference signal and the output feedback signal, and outputs a comparison signal;

an on-time delay unit that is coupled to the control logic unit to obtain a delayed second timing signal according to the first timing signal;

a zero-crossing detection unit that is coupled to an AND gate together with the on-time delay unit, the zero-crossing detection unit receiving a voltage signal representing an inductor current and outputting a zero-crossing detection signal when the voltage signal indicates that the inductor current crosses zero, the AND gate receiving the zero-crossing detection signal and outputting a third timing signal after receiving the second timing signal;

a driving logic unit that generates a first control signal according to the comparison signal, the PWM dimming signal, and a maximum on-time signal, and generates a second control signal according to the third timing signal and a maximum off-time signal, and generates the driving signal according to the first control signal and the second control signal to control on and off states of the main power transistor.

7. The lighting control circuit according to claim 6, wherein the driving unit controls an off time of the main power transistor according to the driving signal derived from the first control signal, and controls an on time of the main power transistor according to the driving signal derived from the second control signal.

8. The lighting control circuit according to claim 4, further comprising:

a protection circuit that is coupled to the protocol conversion circuit and the driving signal generation circuit, and converts the regulation parameters output from the protocol conversion circuit into physical parameter thresholds, and protects the lighting control circuit when the sampled physical parameters reach the physical parameter thresholds.

9. The lighting control circuit according to claim 8, wherein the protocol conversion circuit converts a fourth-channel digital signal into an over-voltage protection regulation parameter and a fifth-channel digital signal into an over-temperature protection regulation parameter, wherein the protection circuit comprises:

an over-voltage protection unit that obtains at least one over-voltage protection threshold according to the over-voltage protection regulation parameter, and outputs an over-voltage protection signal to the driving signal generation circuit when an output voltage exceeds the over-voltage protection threshold; and an over-temperature protection unit that obtains at least one over-temperature protection threshold according to the over-temperature protection regulation parameter, and outputs an over-temperature protection signal to the driving signal generation circuit when the circuit temperature exceeds the over-temperature protection threshold.

10. The lighting control circuit according to claim 1, wherein the protocol conversion circuit converts the input data signal into the multi-channel digital signals with a single-wire communication protocol or a serial communication protocol, the single-wire communication protocol including unipolar Return-to-Zero coding, non-unipolar Return-to-Zero coding, bipolar Return-to-Zero coding and non-bipolar Return-to-Zero coding.

11. The lighting control circuit according to claim 9, wherein the first-channel digital signal consists of a 1 bit, the second-channel digital signal consists of a 2 bits, the third-channel digital signal consists of 8 bits, the fourth-channel digital signal consists of 2 bits, and the fifth-channel digital signal consists of 2 bits.

12. A lighting circuit, comprising:

multi-channel LED strings; and the lighting control circuit according to claim 1, which supplies power to the multi-channel LED strings and is used to control a dimming mode of the multi-channel LED strings.

13. A lighting control method, applied to the lighting control circuit according to claim 1, the lighting control method comprising:

storing input data signal as multi-channel digital signals;

selecting a second-channel digital signal and a third-channel digital signal to be output as a first dimming signal or a third-channel digital signal to be output as a second dimming signal according to a value of a first-channel digital signal;

generating a reference signal according to the second dimming signal and an output feedback signal;

generating a driving signal according to the first dimming signal to control an off time of the main power transistor to achieve a first dimming mode, and generating a driving signal according to the reference signal and the output feedback signal to control an off time of the main power transistor to achieve a second dimming mode, wherein the first dimming mode is a chopper dimming mode, the second dimming mode is an analog dimming mode, the first dimming signal is a PWM dimming signal, and the second dimming signal is an analog dimming signal.

14. The lighting control method according to claim 13, wherein adjusting a duty ratio of the driving signal according to the first dimming signal to adjust a value of a current flowing through the main power transistor; and adjusting an off time of the main power transistor by adjusting a value of the reference signal according to the second dimming signal to adjust a peak value of a current flowing through the main power transistor.

* * * * *